(12) United States Patent
Schultz et al.

(10) Patent No.: US 7,979,710 B2
(45) Date of Patent: Jul. 12, 2011

(54) FILM FINGERPRINTING

(75) Inventors: Mark Alan Schultz, Carmel, IN (US);
Roy Osawa, Indianapolis, IN (US)

(73) Assignee: Thomson Licensing,
Boulogne-Billancourt (FR)

( * ) Notice: Subject to any disclaimer, the term of this patent is extended or adjusted under 35 U.S.C. 154(b) by 1052 days.

(21) Appl. No.: 11/578,229

(22) PCT Filed: Apr. 27, 2004

(86) PCT No.: PCT/US2004/012876
§ 371 (c)(1),
(2), (4) Date: Oct. 11, 2006

(87) PCT Pub. No.: WO2005/114569
PCT Pub. Date: Dec. 1, 2005

(65) Prior Publication Data
US 2007/0229328 A1    Oct. 4, 2007

(51) Int. Cl.
*H04L 9/32* (2006.01)
(52) U.S. Cl. ........................................ 713/176
(58) Field of Classification Search ............ 726/32; 713/176; 341/67; 283/78; 382/116
See application file for complete search history.

(56) References Cited

U.S. PATENT DOCUMENTS

| 5,319,453 A | * | 6/1994 | Copriviza et al. | 346/6 |
| 6,563,936 B2 | * | 5/2003 | Brill et al. | 382/100 |
| 2002/0027612 A1 | * | 3/2002 | Brill et al. | 348/473 |

FOREIGN PATENT DOCUMENTS
WO    WO2004/030339    4/2004

OTHER PUBLICATIONS

Yeh C. H. et al: "Digital watermarking through quasi m-arays° Signal Processing Systems, 1999, SIPS 99, IEEE Workshop on Taipei, Taiwan Oct. 20-22, 1999, Piscataway, NJ USA, IEEE, US, Oct. 20, 1999, p. 456-461 XP010370838 ISBN: 0-7803-5650-0 Abstract Section 'I. Introduction".
Sarah Mc Bride: The Hunt for Movie Pirates, Hollywood Test New Tricks, Including Spying on Audience to find camcorders in crowd. Search Report Dated Oct. 19, 2004.

* cited by examiner

*Primary Examiner* — Samson Lemma
(74) *Attorney, Agent, or Firm* — Robert D. Shedd; Joseph J. Opalach

(57) ABSTRACT

A technique for film marking includes coding a print identifier into a binary-coded bit-complement serial number; identifying particular frames that will be used to convey the bits of the binary-coded bit-complement serial number and marking these bit frames in accordance with the particular bit values of the binary-coded bit-complement serial number. The presence of a predefined mark on a bit frame is representative of a binary digit having a value of one, while the absence of the predefined mark on a bit frame is representative of a binary digit having a value of zero.

7 Claims, 18 Drawing Sheets

FILM FINGERPRINTING

This application is a National Stage Application and claims the benefit, under 35 U.S.C. §365 of International Application PCT/US04/12876 filed Apr. 27, 2004, which was published in accordance with PCT Article 21(2) on Dec. 1, 2005 in English. This application is related to copending, commonly assigned, U.S. patent application Ser. No. 11/578,903 entitled FILM FINGERPRINTING, filed on Oct. 20, 2006; Ser. No. 11/578,222 entitled WATERMARKING OF MOTION PICTURE PRINTS, filed on Oct. 11, 2006; Ser. No. 10/833,263 entitled ANTI-PIRACY CODING OF MOTION PICTURES, filed Apr. 27, 2004; and Ser. No. 10/670,682 entitled MOTION PICTURE ANTI-PIRACY CODING, filed Sep. 25, 2003.

BACKGROUND OF THE INVENTION

The present invention generally relates to apparatus and methods for combating piracy and, more particularly, to content identification.

The ability to securely distribute content and control access thereto, be it a movie, a song, a picture, the written word, etc., is of paramount importance to those who have a vested interest in the content such as the copyright holders, creators, licensees, etc. As such, with respect to film (e.g., a movie) it is known to "fingerprint" film copies such that the possible source of any subsequent copies—legal or illegal—can be identified. In this regard, a big problem with film distribution is found in the final shipping of, what amounts to, thousands of copies ("release prints") to the theaters that will show a single title. In particular, when a company is contracted to mass-produce these thousands of release prints, the company is provided with a master print in film form, from which duplicates are made through contact printing. Unfortunately, building a unique fingerprint on each release print during the contact printing stage is a problem of both mechanics and cost.

SUMMARY OF THE INVENTION

In view of the above, we have realized an efficient and effective technique to place information, e.g., a fingerprint, on content, e.g., a release print of a movie. In particular, and in accordance with the principles of the invention, a copy of a movie is marked by coding a print identifier into a binary-coded bit-complement serial number; and then marking frames of the movie in accordance with the binary-coded bit-complement serial number.

In an embodiment of the invention, a technique for film marking includes coding a print identifier into a binary-coded bit-complement serial number; identifying particular frames (bit frames) that will be used to convey the bits (binary digits) of the binary-coded bit-complement serial number and marking these bit frames in accordance with the particular bit values of the binary-coded bit-complement serial number. Illustratively, the presence of a predefined mark on a bit frame is representative of a binary digit having a value of one, while the absence of the predefined mark on a bit frame is representative of a binary digit having a value of zero.

DETAILED DESCRIPTION

Other than the inventive concept, the elements shown in the figures are well known and will not be described in detail. For example, other than the inventive concept, film duplication, video processing, error detection and correction, encryption, decryption, storage mediums such as a digital versatile disc (DVD), etc., are well known and not described in detail herein. In addition, the inventive concept may be implemented using conventional programming techniques, which, as such, will not be described herein. Finally, like-numbers on the figures represent similar elements.

As used herein, content refers to movies, songs, text, video, pictures, etc. and any combination thereof. Further, the content may be in digital and/or analog form. For example, a movie is representative of content and further comprises video and, typically, audio portions. In addition, the movie can be in digital or analog form. The former represented by digital information conveyed on a digital versatile disc (DVD) or stored in, e.g., other forms of memory (be it volatile, non-volatile, semiconductor, hard disk, CD-ROM, etc.). The latter including a film print, which itself may comprise individual frames, each frame having a single picture and, perhaps, a portion of an audio track. Indeed, the film print may be represented in digital form and distributed on, e.g., a DVD, or stored in other forms of memory. In this regard, content refers to any tangible medium of expression that conveys a movie, song, pictures and/or text or any combination thereof. Similarly, content includes, e.g., a propagated signal, which conveys information (digital and/or analog). In this regard, other examples of content are one, or more, packets conveying digital video over a wired and/or wireless network, or a television broadcast formatted in accordance with analog NTSC (National Television Systems Committee) based transmissions and/or digital ATSC-HDTV (Advanced Television Systems Committee-High Definition Television) based transmissions, etc. Since content may include representations of text, content includes, e.g., source code, object code, etc.

Figure 1:
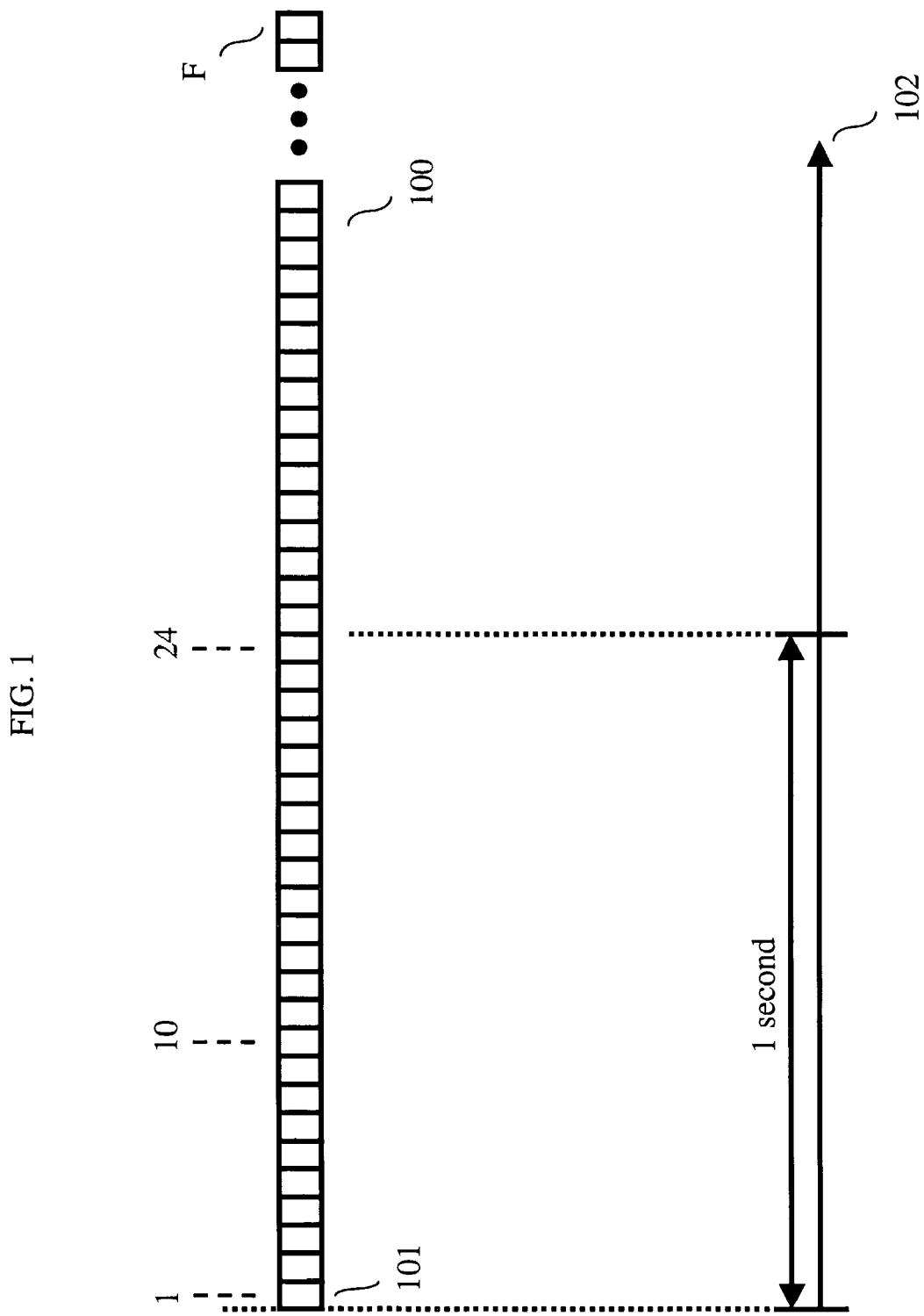
FIGS. 1 to 4 illustrate the inventive concept.

FIGS. 1 to 4 illustrate the inventive concept. Turning first to FIG. 1, a film print 100 (e.g., a master print) comprises a number of frames, F. Illustratively a reference frame 101 identifies a particular one of the F frames. In this example, the reference frame 101 is the first frame, although this is not required. For example, the reference frame can be some other frame of the film print and, e.g., identified by a unique mark on the frame. In addition, there can be more than one reference frame. As shown in FIG. 1, each frame of film print 101 is associated with a number relative to reference frame 101. This is illustrated in FIG. 1 for frame numbers 1 (the reference frame) and 10. It is also assumed for illustration purposes that there are 24 frames per second as can be observed by comparison to time axis 102.

Figure 2:
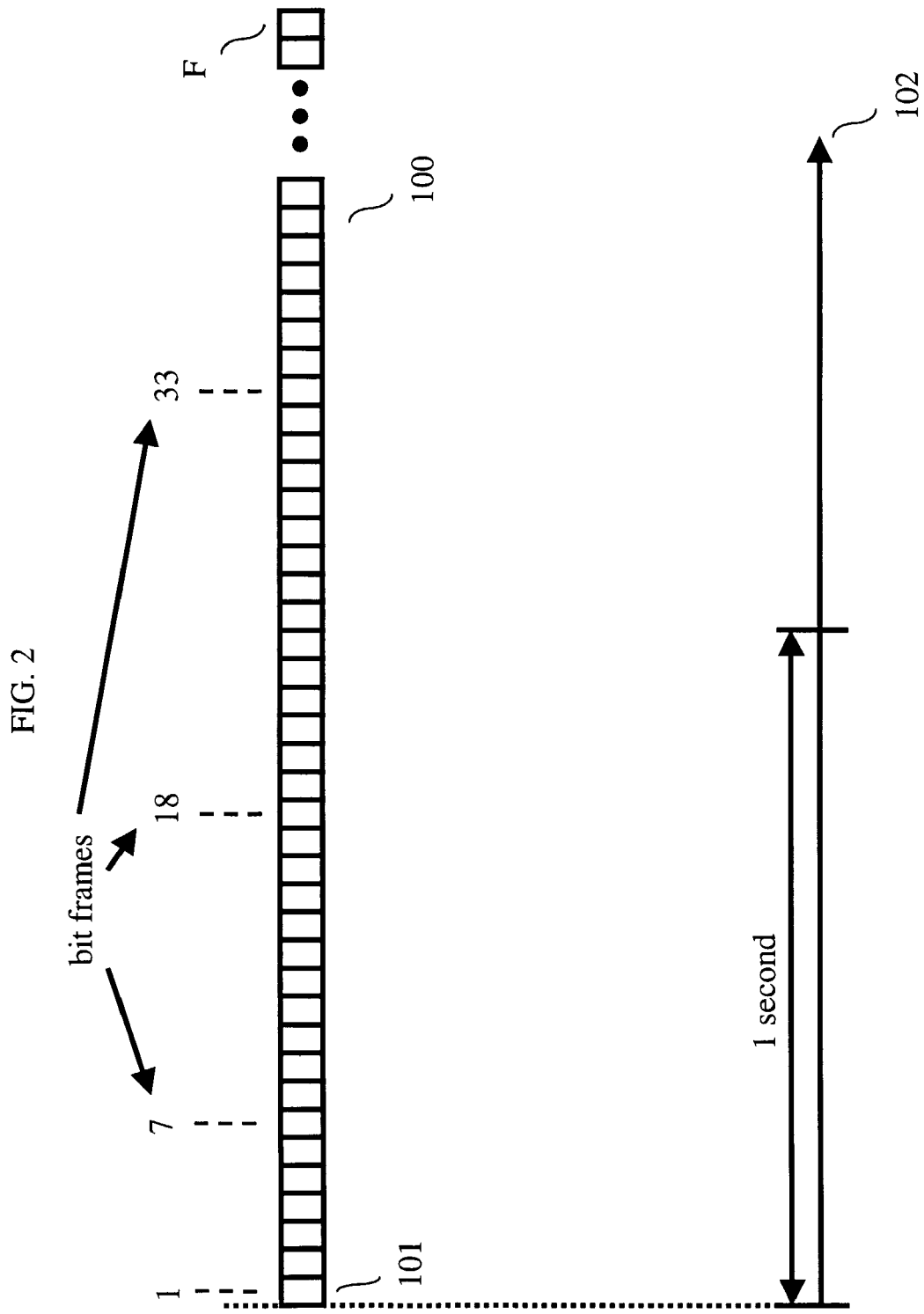
Figure 3:
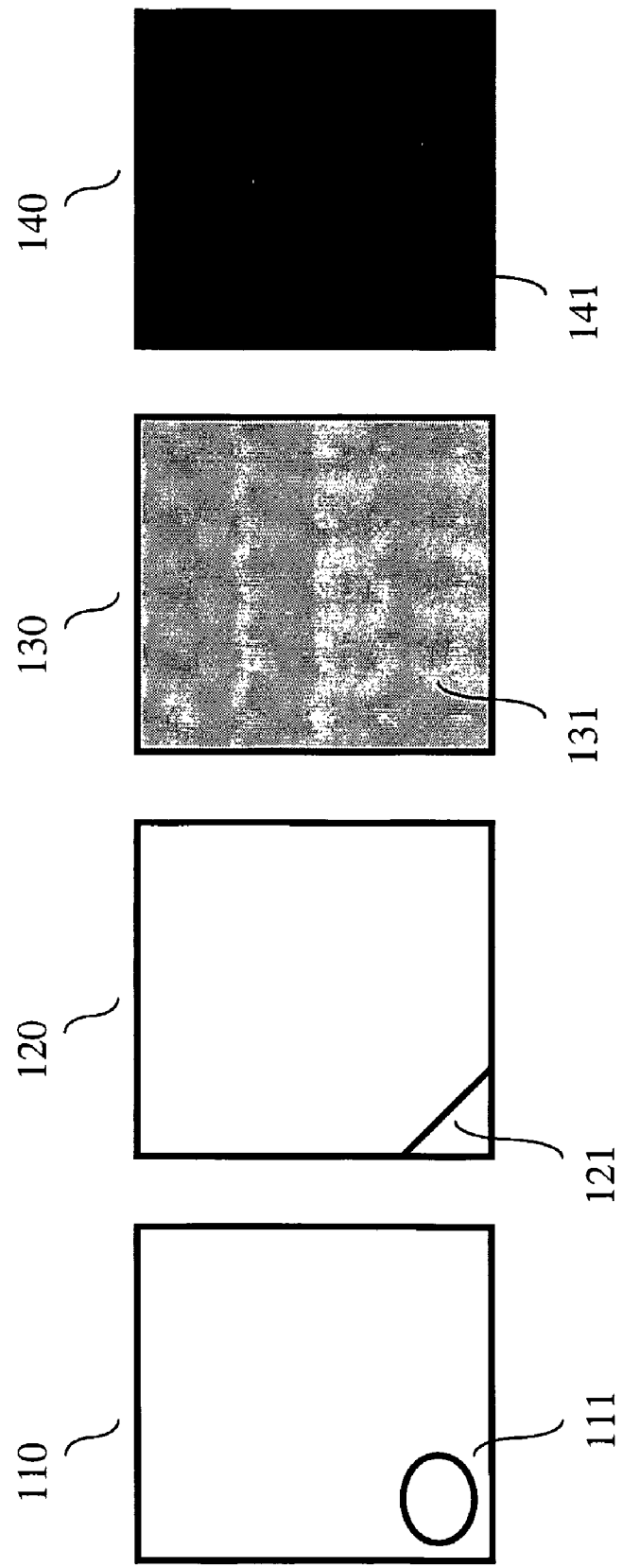

Turning now to FIG. 2, and in accordance with the inventive concept, film print 100 is to be copied and marked with a print identifier, e.g., a number or code. Illustratively, the print identifier is converted, or mapped, into a binary-coded serial number comprising K binary digits (bits), where K>0. In this regard, K frames of film print 100 are identified as "bit frames," where each bit frame conveys information for a binary digit of the binary-coded serial number. For simplicity in describing the inventive concept, K=3 and frames 7, 18 and 33 have been identified as the bit frames (selection of particular frames as bit frames is described further below) to be associated with film print 100. Each bit frame conveys information and, e.g., is "marked," where the mark represents either a binary value of one or a binary value of zero. This mark can take any form or combination of forms. Some simple examples are shown in FIG. 3. For example, the mark can be a predefined pattern in a particular area of the frame, as represented by oval 111 in frame 110 or line 121 in frame 120; or a particular brightness level as represented by gray shading levels 131 and 141 of frames 130 and 140, respectively. Alternatively, the mark can be more complex, e.g., a pattern of dots on a frame (not shown). As such, the form of the particular mark is not relevant to the inventive concept. In accordance with a feature of the invention, the presence of a mark on a bit frame represents a particular binary value, e.g., one, while the lack of a mark on a bit frame represents the other binary value, e.g., zero. However, the invention is not so limited.

Figure 4:
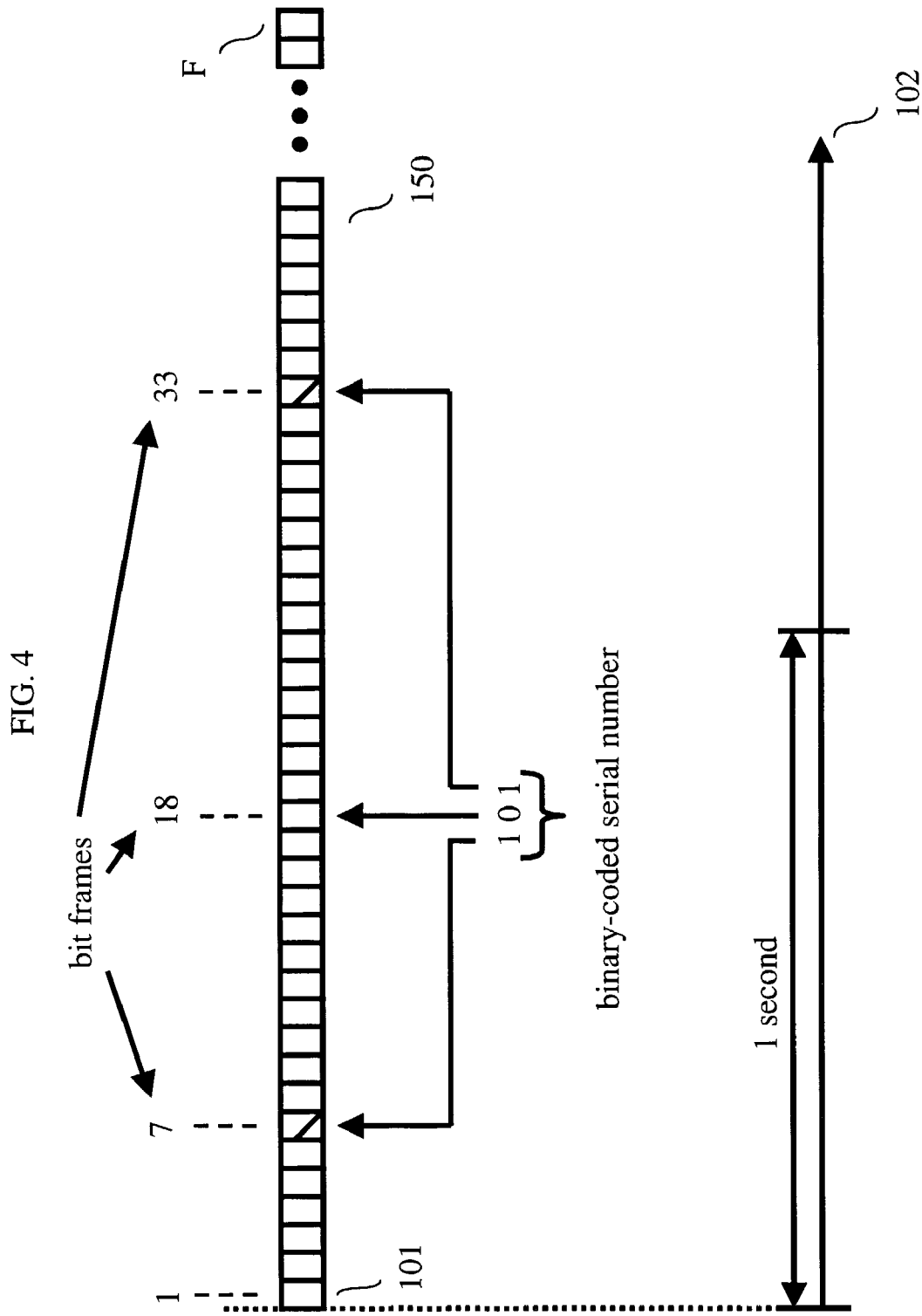

Turning now to FIG. 4, it is assumed that a particular release print 150 (of film print 100 is to be marked with the binary-coded serial number "101" and that the mark is a diagonal line. As such, and as illustrated in FIG. 4, in the resulting release print 150, bit frames 7 and 33 are marked, while bit frame 18 is not marked. Now assume that release print 150 is further copied (legally or illegally). Subsequent examination of the bit frames of the copy of release print 150 would yield the binary-coded serial number "101," which would identify the copy as being made from release print 150. As such, the inventive concept provides the ability to produce a simple, unique, identifier on a release print of a movie that can be used for tracking purposes.

As noted above, the use of a binary-coded serial number of three bits was a simple example of the inventive concept. Indeed, to uniquely identify what could amount to thousands of release prints a larger value of K is required. For example, a binary-coded serial number of, e.g., K=12 bits, could be used to number each print for print runs of up to 4096 release prints. In addition, it should be noted that it may not be possible to subsequently recover all of the K bits from a copy of the release print either due to poor copying or deliberate attempts to remove the binary-coded serial number. As such, and in accordance with the principles of the invention, error detection and correction (EDC) coding can be further used to increase the probability of recovering the binary-coded serial number. For example, a print identifier can be mapped into a 12 bit binary-coded serial number, which is then further EDC coded into a 24 bit EDC binary-coded serial number (e.g., K=24, and there would be 24 bit frames). Any of the known EDC coding techniques are applicable to the inventive concept. For example, convolutional codes, reed-solomon codes, etc.

Figure 5:
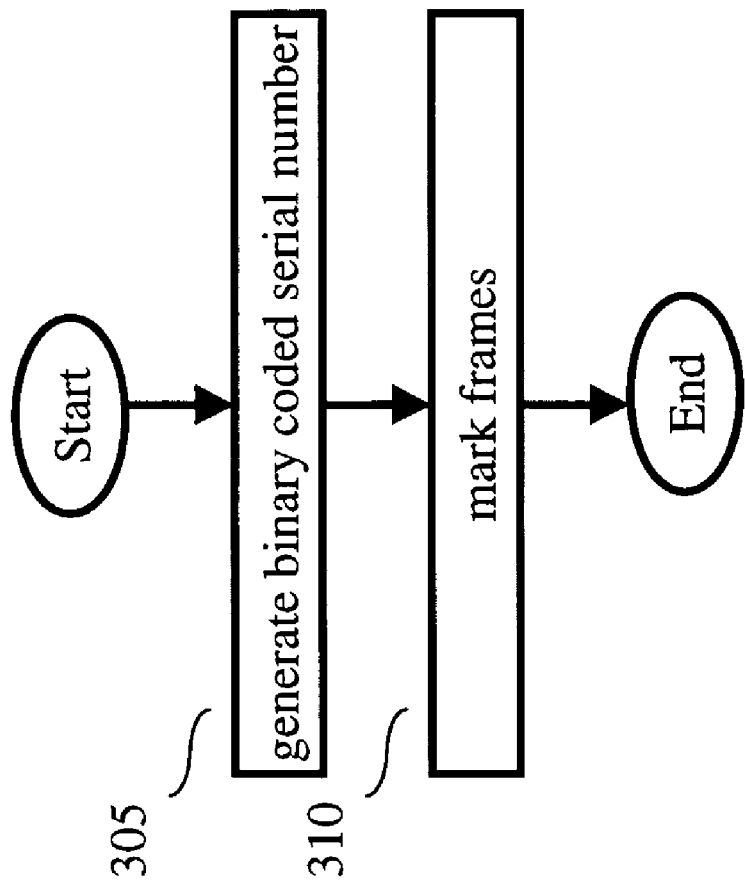
FIG. 5 shows an illustrative flow chart in accordance with the principles of the invention.
Figure 6:
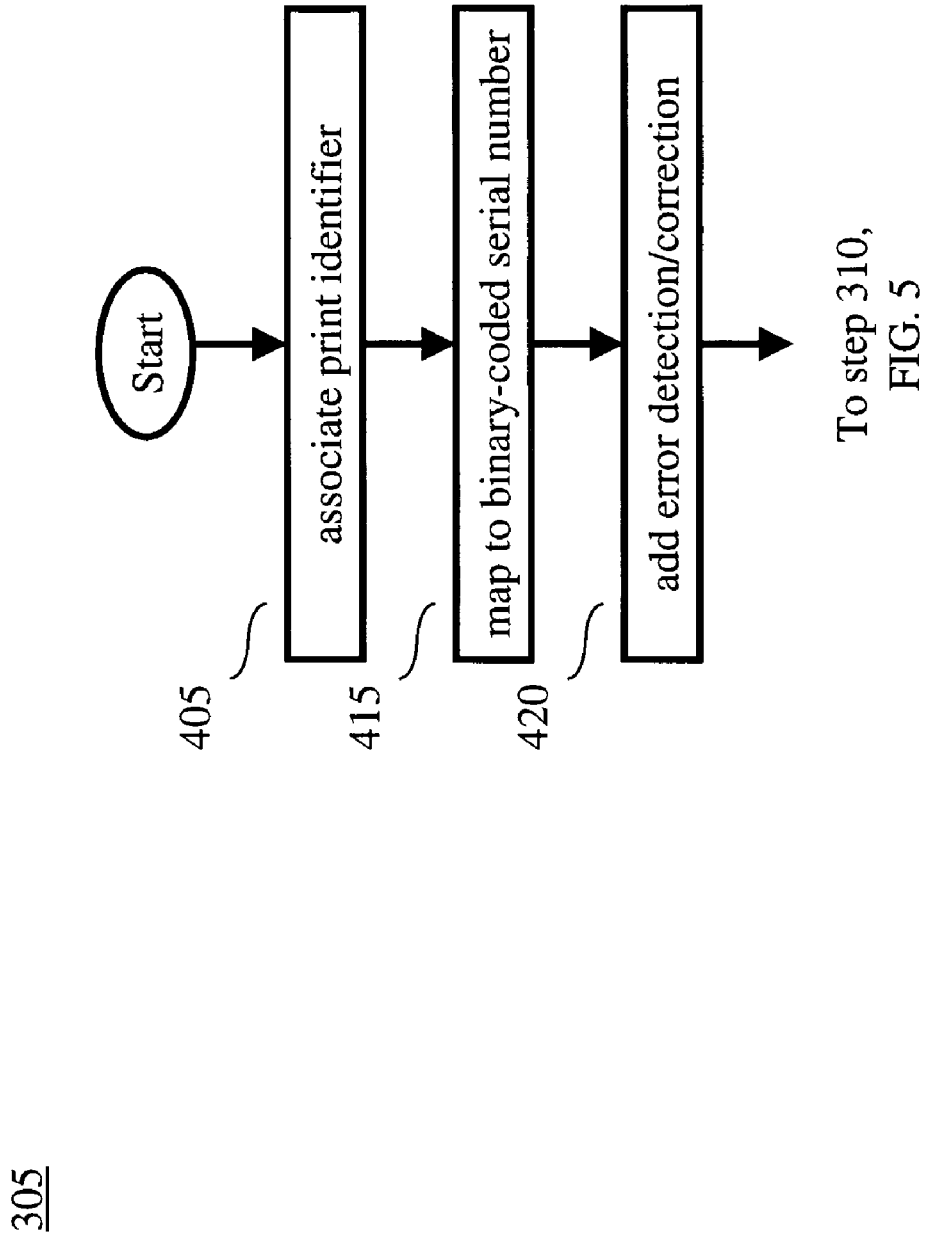
FIG. 6 shows another illustrative flow chart in accordance with the principles of the invention.

Turning now to FIG. 5, an illustrative flow chart in accordance with the principles of the invention is shown. In step 305, a binary-coded serial number is generated to be associated with a copy of a film print. Turning briefly to FIG. 6, an illustrative flow chart for use in generating a binary-coded serial number in step 305 is shown. In step 405, a print identifier is associated with the copy of the film print. This print identifier can be generated in any number of ways, e.g., taken from a predefined list of assignable print identifiers, derived from attributes such as the film title, year of release, time-of-day, theatre, etc. In addition, the generation of the print identifier can be manual or automatic (e.g., from a computer program). Illustratively, the print identifier can be in alpha-numeric form. The print identifier to be associated with the film copy is then mapped to a binary-coded serial number comprising N bits in step 415. In step 420, and in accordance with a feature of the invention, the binary-coded serial number is further EDC coded to add S bits to generate an EDC binary-coded serial number comprising K bits, where K=N+S. As noted earlier, EDC coding is not required and, in this case, K=N.

Figure 7:
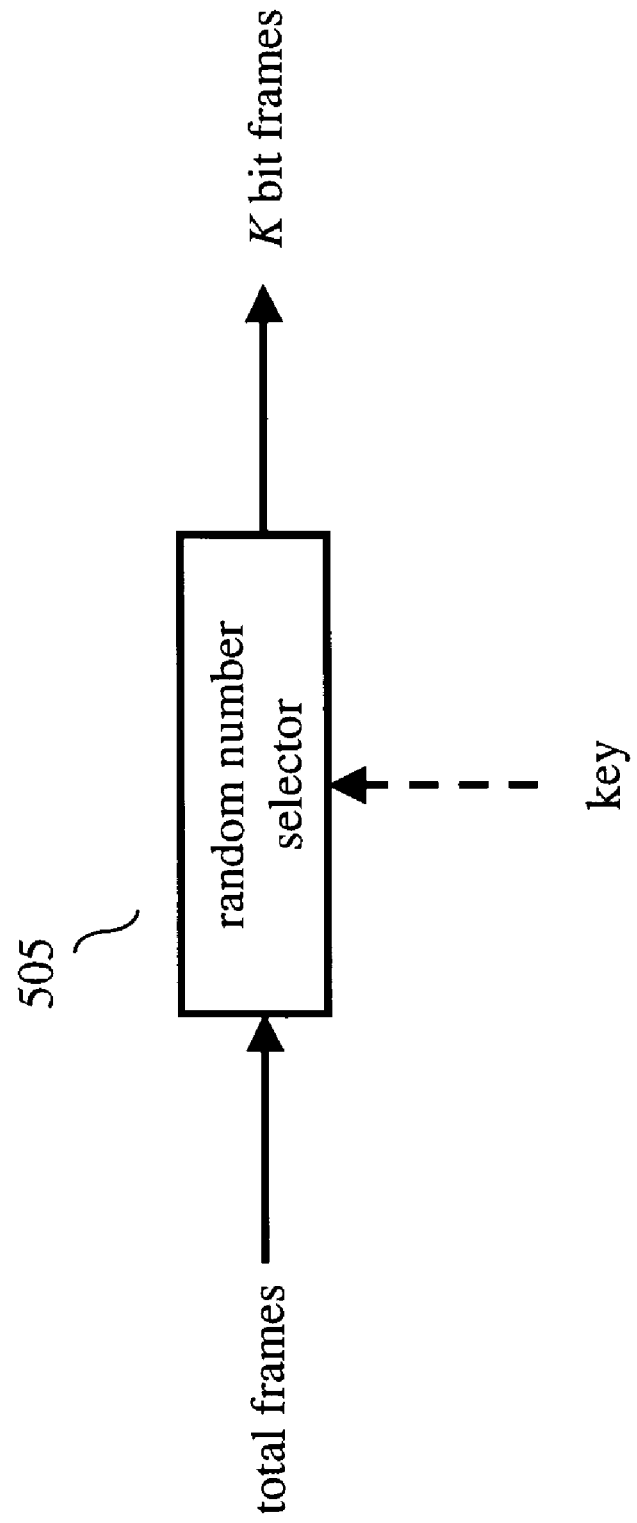
FIG. 7 shows an illustrative technique for generating bit frames in accordance with the principles of the invention.

Returning to FIG. 5, in step 310 frames of the film copy are marked with the binary-coded serial number. Illustratively, one frame is associated with each bit of the binary-coded serial number and is marked in such a way as to represent the particular bit value. Although not required for the inventive concept, the frames to be used for conveying the binary-coded serial number are preassigned. This assignment can be fixed or varying and can be a function of any one of a number of attributes such as, but not limited to, a master print identifier (e.g., the film title, year), the above-mentioned print identifier, etc. For example, for a given movie of 90 minutes duration at 24 frames per second (fps), there are on the order of 129,600 frames. Of these frames, K frames (e.g., 24 frames) are simply selected to convey a 24 bit binary-coded serial number. Alternatively, another example is shown in FIG. 7. In FIG. 7, the total number of frames of the movie is applied to a random number selector 505, which randomly selects the K bit frames out of the total number of frames as a function of a key value (or seed value) also applied to random number selector 505. The key value can be associated with one or more of, e.g., the master print identifier, date, time-of-day, etc. As such, a certain level of security can be provided as to the location of the bit frames in the film copy. Indeed, only the printing company needs to know exactly where the marks are found and even then it could be unknown to humans. For example, the identification of the bit frames can be further stored in an encrypted file and, as described further below, the actual marking of the film can be automated such that the exact locations of the marked frames is kept secret.

Figure 8:
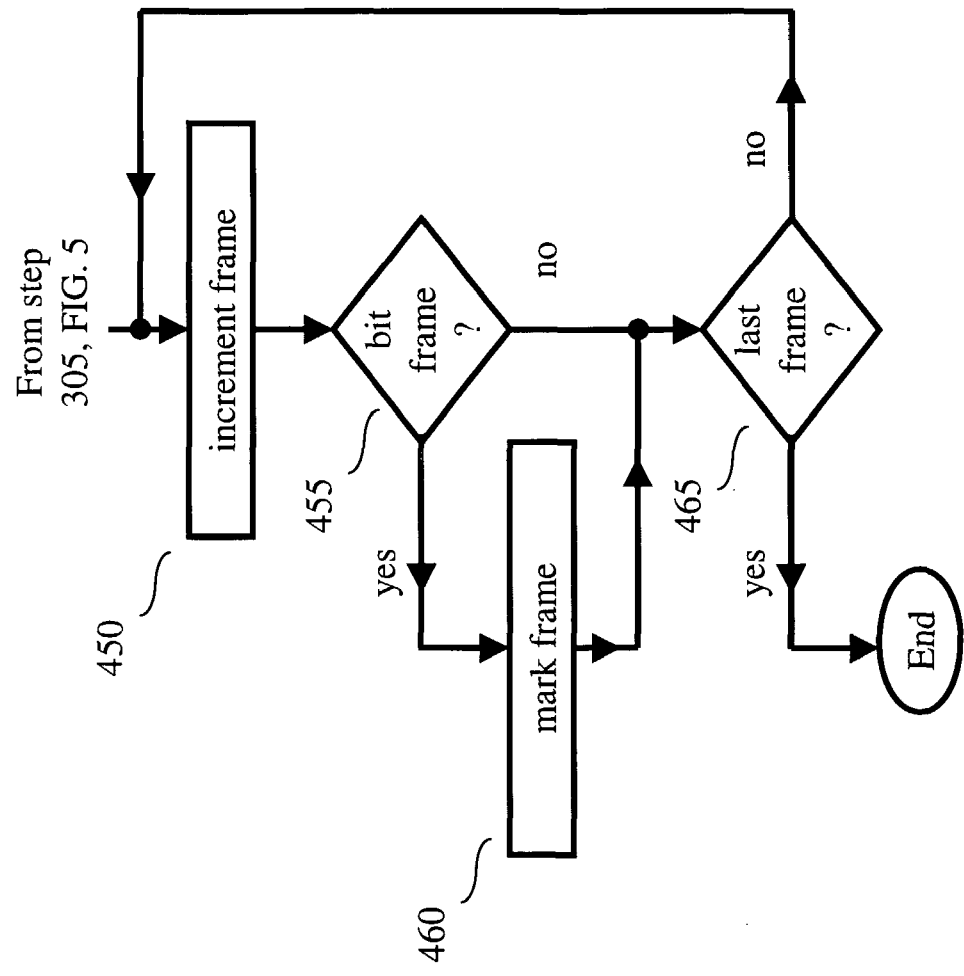
FIG. 8 shows another illustrative flow chart in accordance with the principles of the invention.

Turning now to FIG. 8, an illustrative flow chart for use in marking a copy of a film in step 310 is shown. In the flow chart of FIG. 8, a frame count variable (not shown) is used to track the location of the current frame. Illustratively, the frame count variable is initialized to zero. In step 450, the value of the frame count variable is incremented. In step 455, the value of the frame count variable is checked to determine if the current frame is a "bit frame." If the current frame is not a bit frame, then execution proceeds to step 465 to check if the current frame is the last frame. If the current frame is the last frame, execution ends. Otherwise, execution returns to step 450 and the frame count variable is incremented, etc. Returning to step 455, if the current frame is a bit frame, then the frame is marked in step 460 in accordance with the value of the respective bit of the binary-coded serial number. Illustratively, as shown in FIG. 4, if the bit value is a "one," then a predefined mark is made on the bit frame. However, if the bit value is a "zero," the bit frame is not marked.

Figure 9:
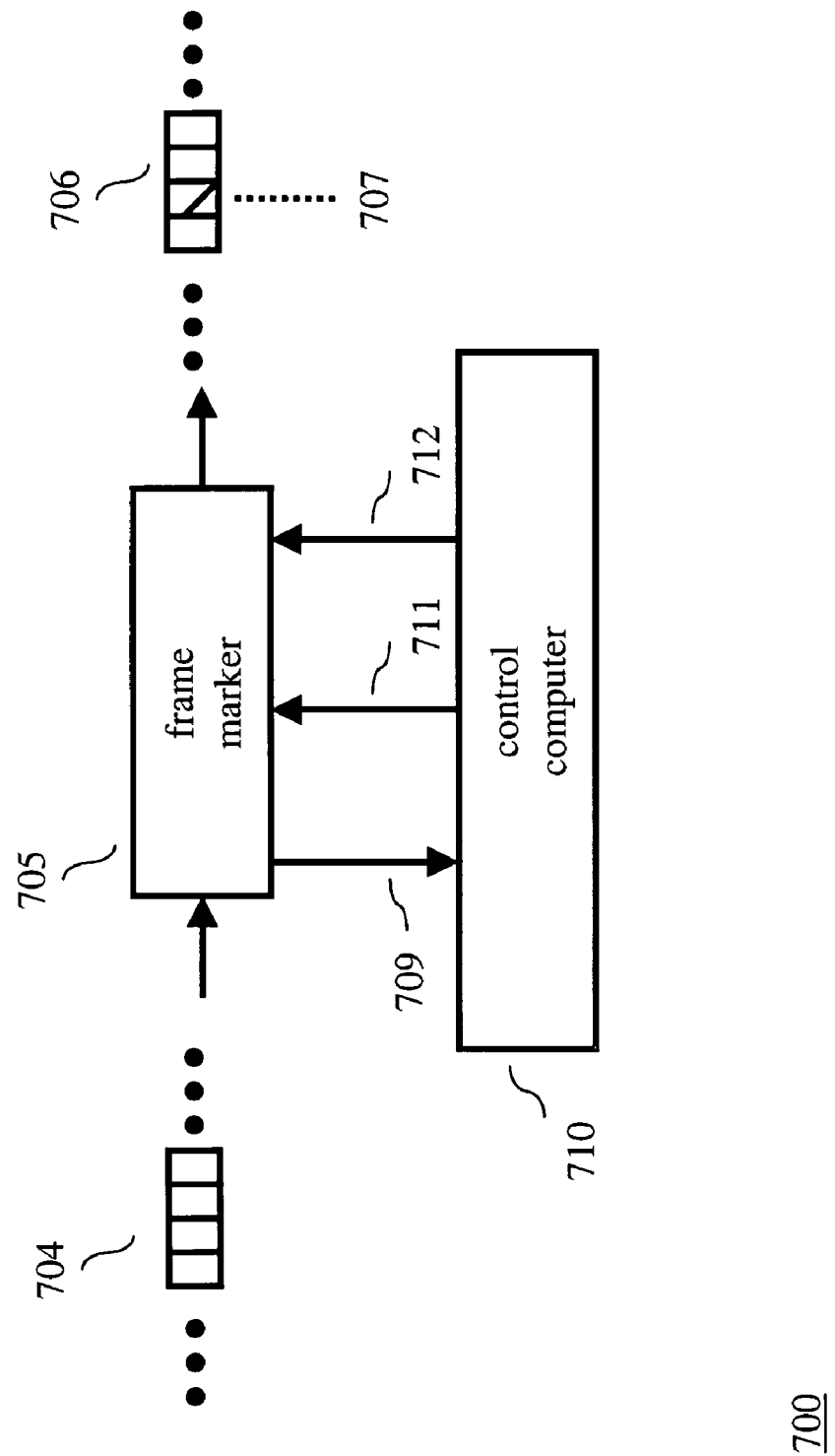
FIG. 9 shows an illustrative marking apparatus in accordance with the principles of the invention.

An illustrative frame marking apparatus 700 in accordance with the principles of the invention is shown in FIG. 9. Frame marking apparatus 700 comprises a frame marker 705 and a control computer 710. The latter is representative of any stored-program control processor and associated memory, e.g., a personal computer (PC), and executes, e.g., programs representative of the above-described flow charts shown in FIGS. 5, 6, 7 and 8. Control computer 710 can be an existing computer or one dedicated to fingerprinting. A film copy 704 is applied to frame marker 705. The latter provides current frame information via signal 709 to control computer 710. Control computer 710 controls marking at the appropriate time via signal 712 and incrementing of the film copy through the apparatus 700 through signal 711. The processed film copy 706 includes marked bit frames as represented by marked frame 707. The frame marker 705 is representative of any one of a number of ways of marking film. For example, in one embodiment the frame marking apparatus 700 is a part of the copying machine (not shown) and is located in a darkroom. In this example, frame marker 705 is a light gate that modifies the bit frames at the time of film exposure during the contact printing stage. The light gate can be a mechanical shutter or an electronic switch to remove a portion of the exposure light from the film to create, e.g., a dark area. Alternatively, frame marker 705 is a strobe that is used to create a clear (bright) area on the film. It should be noted that the area of the bit frame being marked can vary from a very small spot to an entire frame depending on the desired marking. If only one out of thousands of frames is marked, the markings would not be very intrusive to the movie viewers.

Although shown as a separate apparatus in FIG. 9, the inventive concept is not so limited. The marking of the bit frames of a film copy can occur during creation of the film copy or subsequent to the creation of the film copy. In other words, the film marking can occur during, or be separate from, the copying process. As such, it should be noted that film copying apparatus as known in the art may be modified to mark frames in accordance with the principles of the invention.

Figure 10:
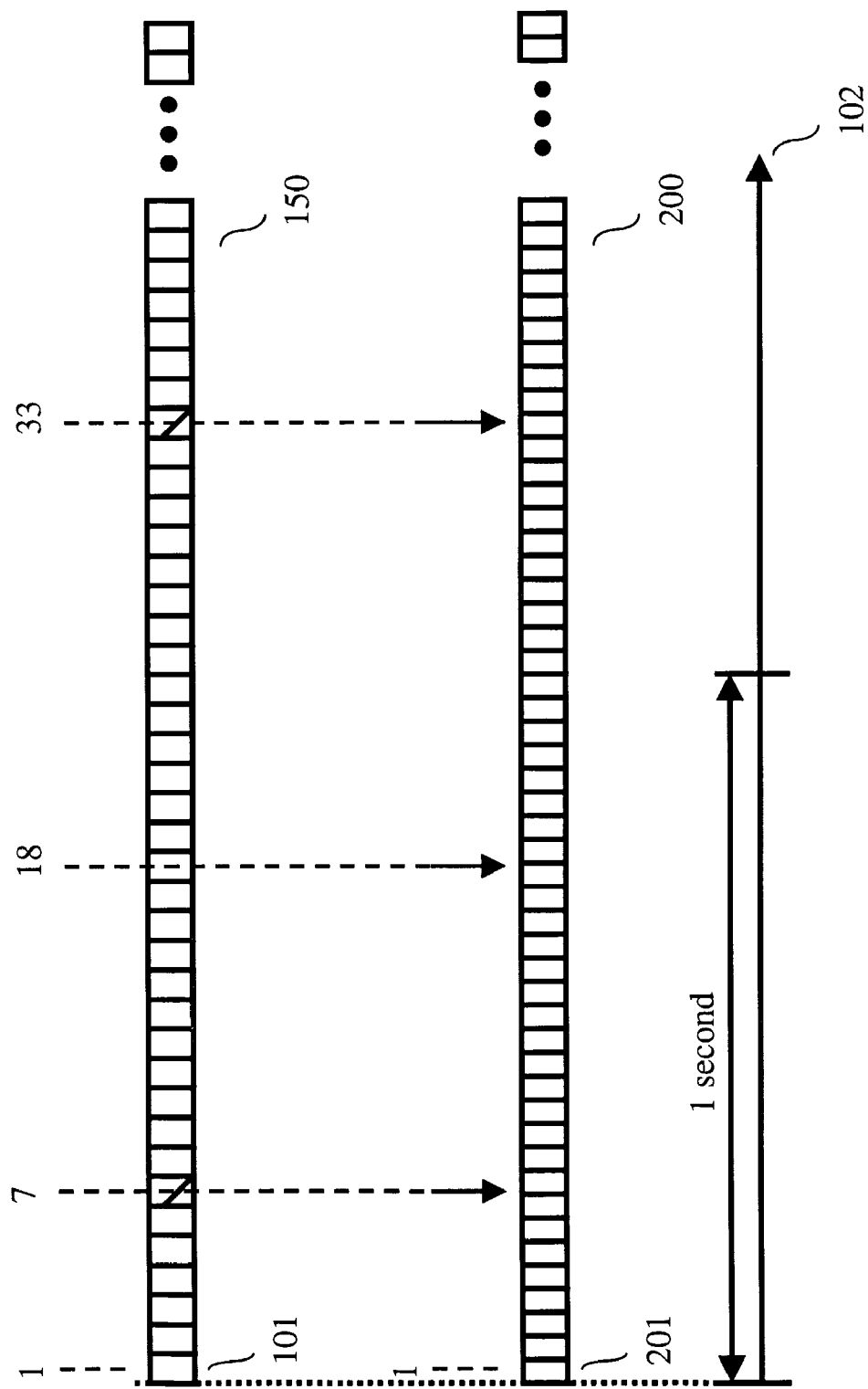
FIG. 10 illustrates detection of a marking pattern in accordance with the principles of the invention.

As noted above, if a pirate records the film in a theater and sees one or more of the marks, the pirate may try to edit the illegal copy to remove the marks. In accordance with the above-described feature of the invention, since only one of the bit values is actually marked, e.g., a bit value of one, only those bits are susceptible to removal. In particular, the noise characteristic of this "channel" is not a binary symmetric channel (BSC), where the noise is such that the probability of a "1" being changed to a "0" is the same (symmetric) as the probability of a "0" being changed to a "1." Instead, the channel is a binary asymmetric channel (BAC), where the probability of a "0" being changed to a "1" is almost zero. As such, the only error of concern is that of a "1" being changed to a "0". In this regard, the use of EDC coding would further enable recovery of a binary-coded serial number (and therefore the associated print identifier). For example, given the total number of frames and the key value, the location of the K bit frames can be recovered. (Alternatively, once determined, the location of the K bit frames may simply be stored in encrypted or unencrypted form in a file associated with a master print.) Once the K bit frames are known, these particular frames are examined in the copy for recovering the binary-coded serial number. Indeed, even if the pirate recorded the copy at a different frame rate, recovery of the binary-coded serial number is still possible as illustrated in FIG. 10. In FIG. 10, a film copy 150 recorded at 24 fps is marked with a three digit binary-coded serial number in frames 7, 18 and 33. During a showing of the film at a theatre, a pirate records the film copy 150 at 30 fps to produce film copy 200. As such, the camcorder expands the 24 fps movie into a 30 fps movie. As illustrated in FIG. 10, frame 7 of film copy 150 would occur 7/24 seconds from the start of the film and be found in frame 8 or 9 in film copy 200 (i.e., at frame (7/24)*30).

It should be noted that although the above description was in the context of a film print, the above-described marking also applies to a film copy stored on, e.g., a DVD, in memory etc.

As described above, the inventive concept provides the ability to produce a simple, unique, identifier on a release print of a movie that can be used for tracking purposes. Additionally, the inventive concept provides an efficient and effective method to place information on a film during the exposure time of the final release print. It should be noted that the master copy of the film is not required to have similar markings (although it may) and no pre-processing of the film is needed. It should also be noted that the above-described marking can also be performed in "layers" to capture an entire distribution chain from a master print to a release print. For example, a master film print may have only a few marks (a smaller size binary-coded serial number), while an intermediate print copy has a more marks (a larger size binary-coded serial number) and a release print has even more marks (an even larger size binary-coded serial number). In addition, markings can be interleaved such that multiple marks can be made on the same bit frame. In this case the markings may be on a different area of the frame and/or the markings may be different from each other. Also although the inventive concept was described in the context of a frame count, a time reference could equivalently be used such that a film copy is marked at particular times that may be fixed or varying, e.g., randomly determined. In this context, a sequence of "marking times" is determined (e.g., by the random number generator shown in FIG. 7) and frames occurring at these marking times are designated as the bit frames.

As noted earlier, a binary-coded serial number may include additional bits for use in error correction and detection and such a binary-coded serial number is also referred to herein as an EDC serial number. While more complex coding schemes such as Reed-Solomon Codes and Goppa Codes may be used in accordance with the principles of the invention, these approaches may be too costly. In this regard, a simpler EDC coding scheme using bit-complements is described below.

First, a serial number list of binary numbers is constructed. Each binary-coded number in this list comprises "N" bits, i.e., is an N-bit binary value and is available for assignment to, e.g., a particular film copy. In addition, each N-bit binary number in the list has the same weight "W". Illustratively, the weight, W, of a binary number is defined as the number of "1s" in the binary number, where W<N. (It should be noted that equivalent definitions could be created, e.g., the weight could be defined as the number of "0s", etc.) In view of the above, the serial number list is the set of all N-bit binary values of weight W. It may be preferable to pick values for W such that W>N/2. Such values for W minimize the number of "1s" so that the marking on the film is less intrusive to a viewer. However, the inventive concept is not so limited. It should be noted that the total number of N-bit binary values of weight W available for a serial number list are permutations and that this can be mathematically stated as "N choose W". As such, the following formula can be used to determine the total number of N-bit binary-coded serial numbers of weight W that are available for a serial number list:

$$\text{total\_number} = \frac{N!}{W!(N-W)!}. \quad (1)$$

For example, for values of N=16 and W=9, a serial number list comprises 11,440 binary-coded serial numbers. Such a list of binary-coded serial numbers should be enough to cover most "major" theaters in the United States. However, in order to illustrate the inventive concept, a simpler example is described below.

Figure 11:
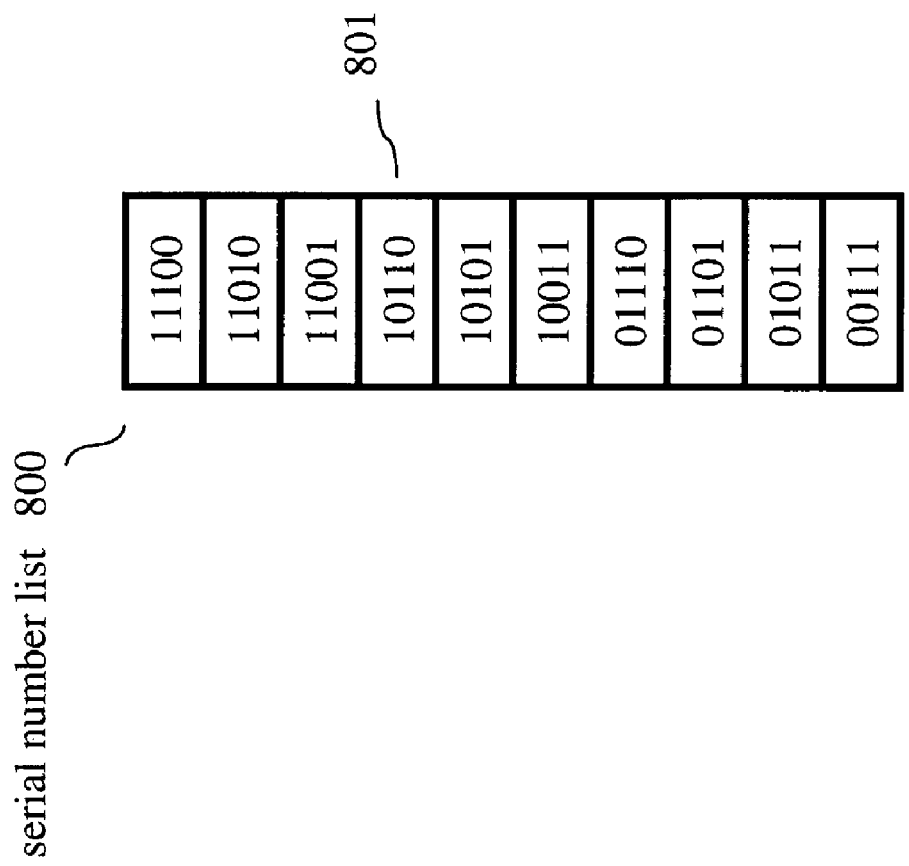
FIG. 11 illustrates a serial number list in accordance with the principles of the invention.

An illustrative serial number list 800 is shown in FIG. 11 for N=5 and W=3. From equation (1), list 800 comprises 10 binary-coded serial numbers, each having three "1s" and two "0s". It should be observed that each binary-coded value from this list can be easily converted to, e.g., a decimal value, which in turn can be used as a serial number for the film-print on, e.g., an inventory document. For example, the binary-coded serial number "11100" from list 800 corresponds to a decimal value of "28".

After creation of the serial number list, a codeword is formed from list 800. First, a binary-coded serial number is selected for assignment to a film copy. This selection can be performed in any number of ways, e.g., random, next available, etc. In this example, binary-coded serial number 801 is selected ("10110"). The selected binary-coded serial number is denoted as "M". From M, two bit-complements of M are constructed and denoted as $M_1$ and $M_2$, i.e., $$M_1 = \text{bit-complement of M; and} \quad (2)$$

$$M_2 = \text{bit-complement of M.} \quad (3)$$

As known, a bit-complement is obtained by flipping each bit. In this example, M=10110, therefore:

$M_1$=01001; and $M_2$=01001.

In accordance with the principles of the invention, $M_1$ and $M_2$ form "parity-check" bits and the combination of M, $M_1$ and $M_2$ form a "codeword" (M, $M_1$, $M_2$):

$$(M, M_1, M_2) = (10110; 01001; 01001). \quad (4)$$

where M, $M_1$ and $M_2$ are also referred to herein as the "elements" of the codeword. The codeword is also referred to herein as the binary-coded bit-complement serial number.

Since the weight of $M_1$ (or $M_2$) is equal to (N−W), the total weight of the codeword (M, $M_1$, $M_2$) becomes:

$$\text{Total\_weight} = W + (N-W) + (N-W); \text{ or} \quad (5)$$

$$\text{Total\_weight} = 2N - W. \quad (6)$$

As noted above, W<N/2, therefore:

$$\text{Total\_weight} = 2N - W < 2N - N/2 = 3N/2. \quad (7)$$

From equation (7), the total weight of a codeword can be kept less than 3N/2.

After selection of the codeword, K bit frames are selected as described earlier for conveying the values of the various bits of the codeword. In particular, $$K = (J)(N); \quad (8)$$

where J is the number of binary-coded serial numbers and complements thereof (i.e., the number of elements in a codeword), and N is the number of bits in a binary-coded serial number. In this example, K=(3)(5)=15 bit frames are selected.

For example, the corresponding bit frames may be frames: 20, 43, 60, 79, 96, 109, 131, 159, 181, 202, 231, 255, 286, 304, 325 of the film copy. As such, the K bit frames are also referred to herein as a "bit frame set." However and in accordance with the principles of the invention, this bit frame set is further divided into J groups of bit frames, i.e., bit frame groups, $K_1$ through $K_J$, where each bit frame group is associated with one of the elements of the codeword. In this regard, there is no requirement as to how the various bit frames (of a bit frame set) are placed in each bit frame group other than that the bit frame values in each group must occur in sequence. Continuing with the illustrative set of 15 bit frames above, one exemplary assignment of bit frames to bit frame groups is:

$K_1$={20, 79, 159, 286, 304};

$K_2$={96, 131, 202, 231, 325}; and $K_3$={43, 60, 109, 181, 255}.

Each element of the codeword is assigned to one of these bit frame groups. For example, $M = K_2$;

$M_1 = K_1$; and $M_2 = K_3$.

Preferably, the bit frame set, bit frame groups and assignment of bit frames groups to codeword elements is kept secret by, e.g., the print marking facility to deter hackers. It should be noted that one reel of film is typically 2,000 feet long, where there are 16 frames per foot, which gives a total number of frames in a reel of about 32,000 frames. As such, even with a small value such as N=5, which only gives ten binary-coded serial numbers, it will be difficult, if not impossible, for a hacker to guess the actual bit frame positions.

Figure 12:
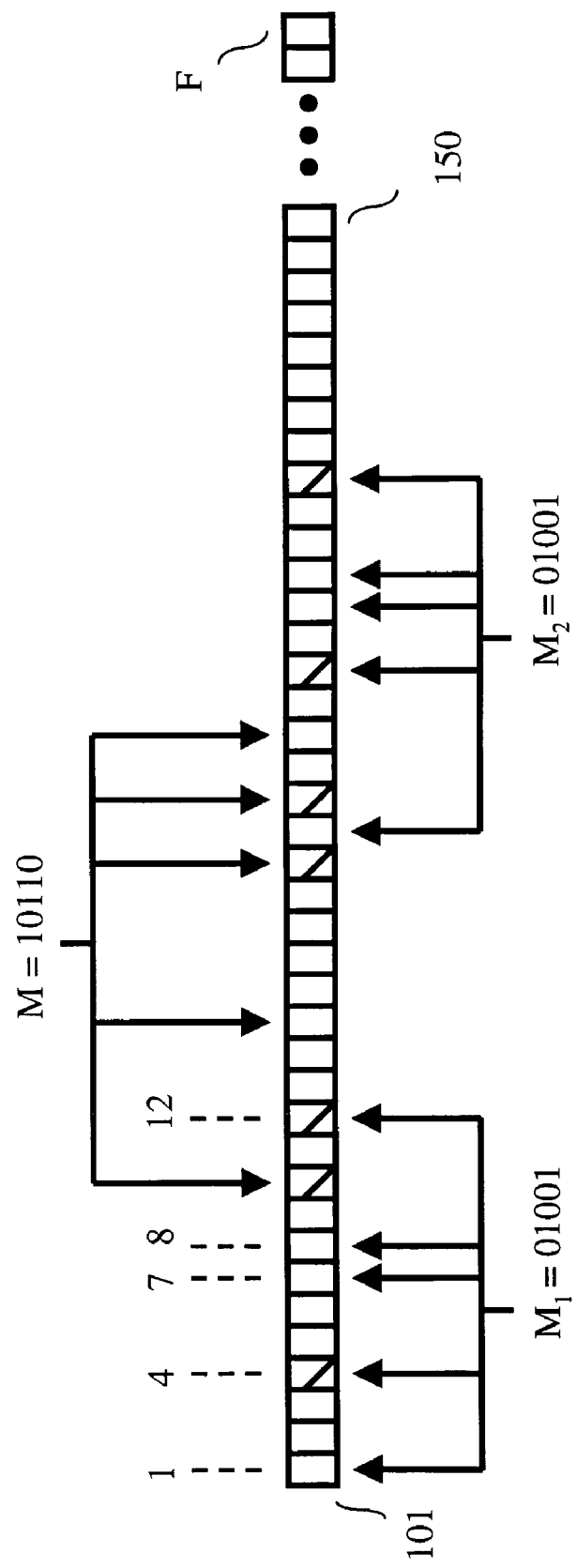
FIG. 12 illustrates bit frame groups in accordance with the principles of the invention.

Another illustration of bit frame groups is shown in FIG. 12 for the bit frame set {1, 4, 7, 8, 10, 12, 15, 20, 21, 22, 24, 26, 28, 29, 32}. It is assumed that:

$K_1$={1, 4, 7, 8, 12};

$K_2$={10, 15, 20, 22, 24}; and $K_3$={21, 26, 28, 29, 32}.

As illustrated in FIG. 12, $M = K_2$;

$M_1 = K_1$; and $M_2 = K_3$.

Figure 13:
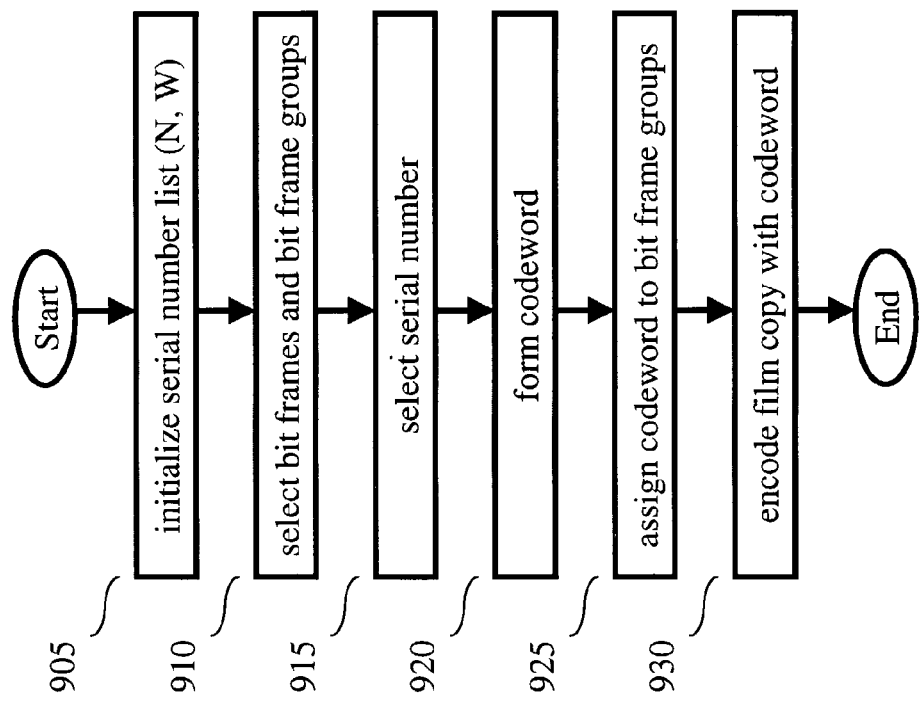
FIG. 13 illustrates a flow chart in accordance with the principles of the invention for performing bit-complement coding.

In view of the above, an illustrative binary-coding bit-complement encoding flow chart in accordance with the principles of the invention is shown in FIG. 13. In step 905 a binary-coded serial number list is initialized in accordance with predefined values of N and W. In step 910, K bit frames are selected and J bit frame groups are formed. In step 915, a particular serial number is selected from the serial number list. In step 920, a codeword is formed, as illustrated above. In step 925, the elements of the codeword are associated with respective bit frame groups. Finally, in step 930, a film print is encoded with the codeword.

Figure 15:
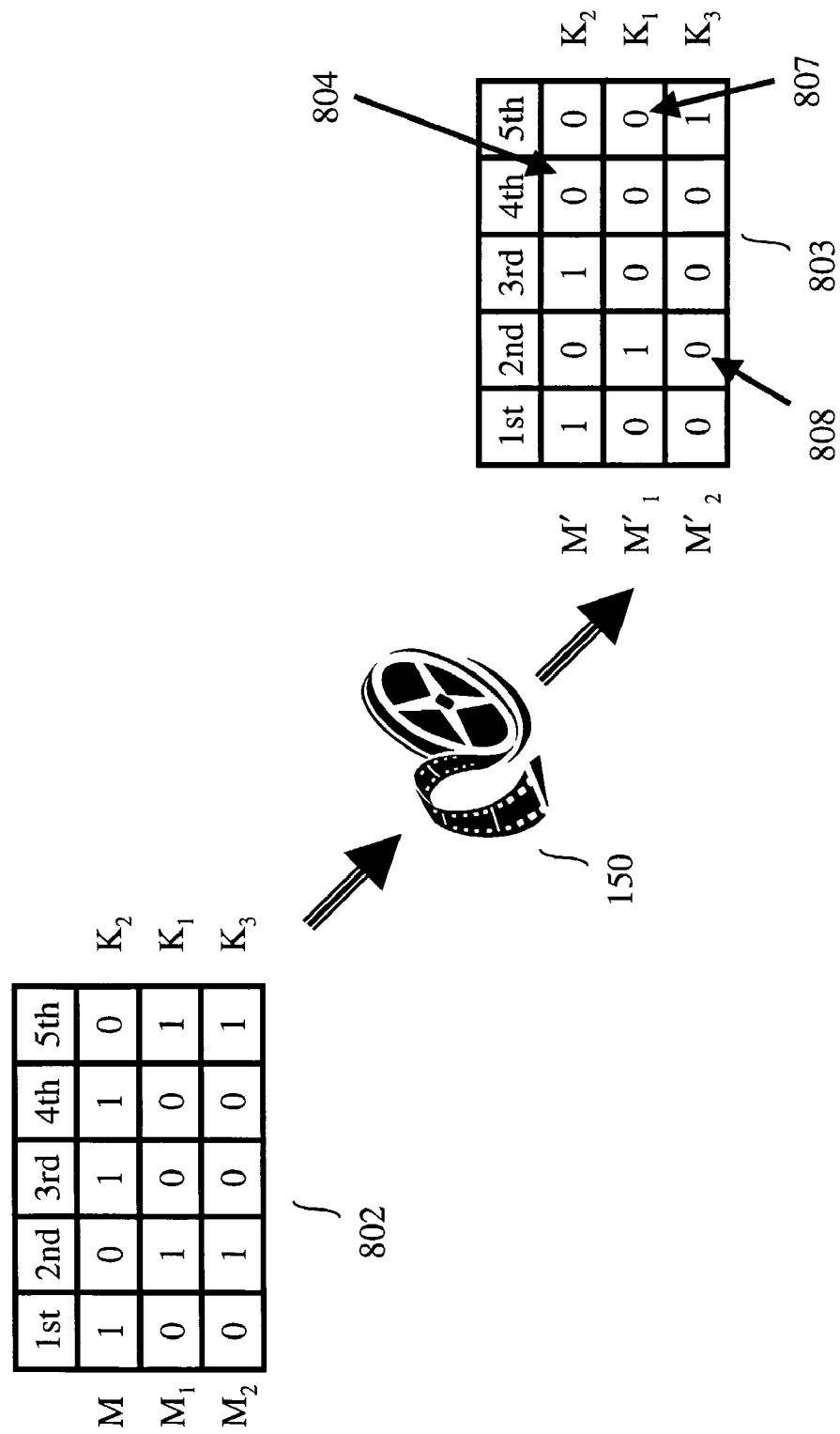
Figure 16:
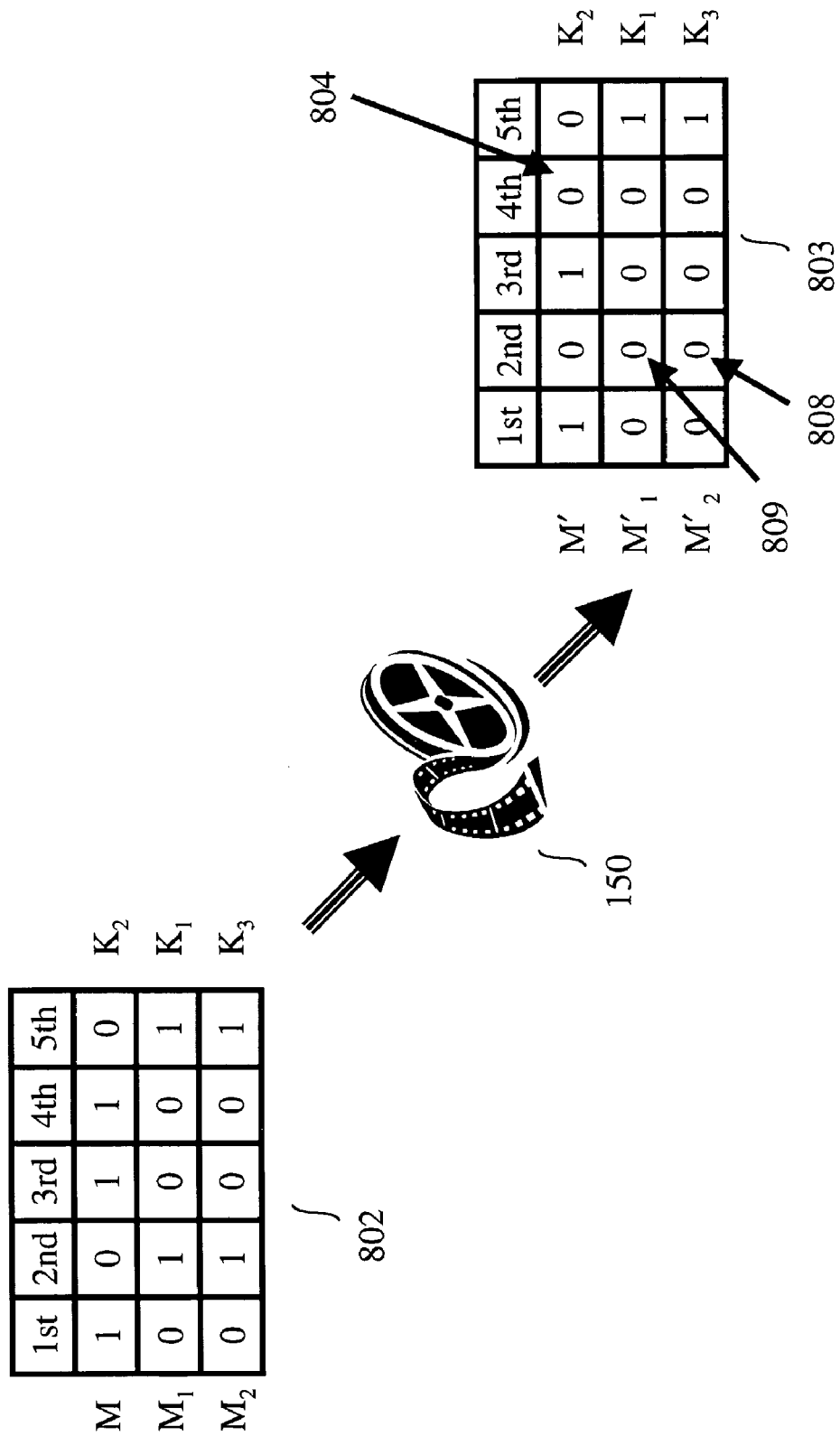

Turning now to the recovery process, recovering the encoded binary-coded serial number from a copy may be subject to errors from anyone of a number of sources. For example, mechanical noise, error by a lab technician, or even deliberate tampering by a hacker. However, as noted earlier, the channel is a binary asymmetric channel (BAC), where, e.g., the probability of a "0" being changed to a "1" is almost zero. Further, as noted above, it is assumed that the bit frame set is kept secret. As such, and absent a priori knowledge of the bit frame set, it can be assumed that during the recovery process any bit frames having a detected value of "1" are correct. As a result, recovery of the actual binary-coded serial number can be aided by use of the weight W. This is illustrated in FIGS. 14-16.

Figure 14:
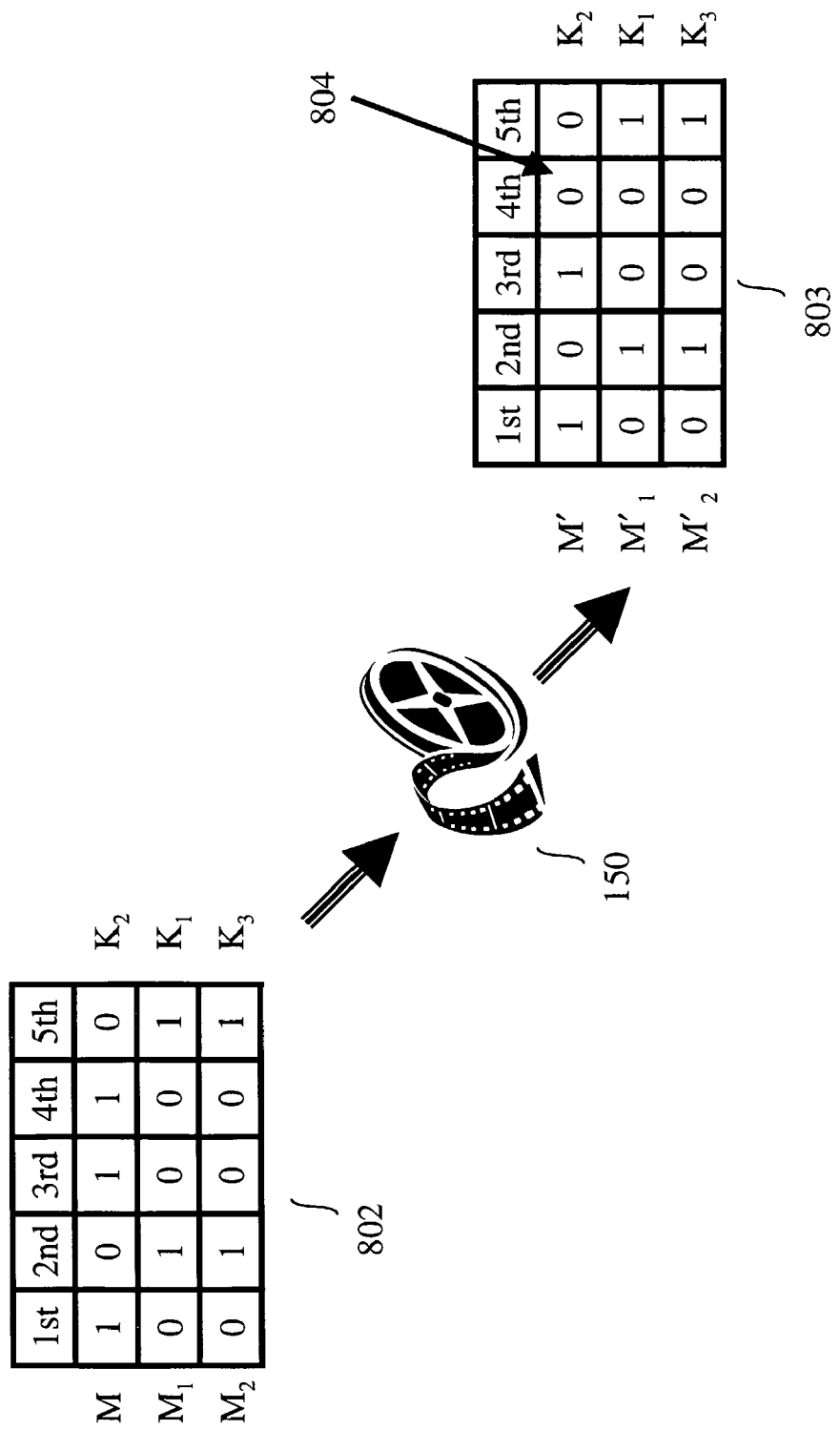
FIGS. 14-17 illustrate recovery of a bit-complement coded serial number in accordance with the principles of the invention.

Turning first to FIG. 14, table 802 illustrates an alternative view of the bit frame groups and the mapping to the various elements of a codeword using the example from FIG. 12. As illustrated in FIG. 14, a film copy 150 is marked in accordance with the bit frame groupings $K_1$, $K_2$ and $K_3$. In table 802, each bit frame of a bit frame group is indexed, i.e., $1^{st}$, $2^{nd}$, $3^{rd}$, etc., but these positions are not related to actual bit-frame positions in film print 150. Instead, these positions simply show their sequential order in the bit frame group. For example, the second bit frame of bit frame group K, conveys a "1" (which corresponds to frame number 4 of FIG. 12). Now, assume that forensics performed on film copy 150 results in a recovered, or extracted, codeword (M', M'$_1$, M'$_2$). (As known in the art, and other than the inventive concept, the term "forensics" refers to the analysis of a film copy to recover therefrom a serial number.) The recovered codeword is shown in table 803. As illustrated by arrow 804, the $4^{th}$ bit of M' now conveys a "0" value. That is, the marking in the $4^{th}$ bit frame of bit frame group $K_2$ has been erased. In accordance with the principles of the invention and since, as noted above, it can be presumed that values of "1" are correct, the first step in recovering the binary-coded serial number is to compare the weights of each element of the recovered codeword against the known value of W (or in the case of a bit-complement, (N-W)). In other words, by computing the weight of each element of the recovered codeword it can be determined if the various elements of the recovered codeword are correct or, if not, how many marks have been erased. Referring back to FIG. 14, it can be immediately observed that element M' only has a weight of 2 when it should have a weight of 3. Therefore, the recovered value for M' is wrong and one mark has been erased. However, it can be also observed from FIG. 14 that the weights of M'$_1$ and M'$_2$ are both 2, which is the correct weight value for bit-complements. Therefore, M'$_1$ and M'$_2$ are correct.

Since the weight of M' should have been a 3, a bit value of "1" could have been erased from either the $2^{nd}$, $4^{th}$ or $5^{th}$ positions. However, comparison to just one of the other values of either bit-complement M'$_1$ or bit-complement M'$_2$ (which in this example are now known to both be correct) indicates that the $4^{th}$ bit position of M' should have been a "1." Therefore, in order for M' to have a weight of 3, the $4^{th}$ bit-frame of bit frame group $K_2$ was originally marked with a "1" and the binary-coded serial number, M, is 10110.

In view of the above, and as can be observed from FIG. 14, even if (J-1) bit frame groups are in error (including the extreme case when all the "1s" therein are erased), all of the (J-1) bit frame groups in error can be recovered when just one bit frame group of the recovered codeword has the correct weight. Thus, the weight of each element of the recovered codeword is used as an error indicator and is compared to the predefined correct weight for either the binary-coded serial number (i.e., W) or the bit-complements (i.e., (N-W)) as appropriate. Once an element of the recovered codeword is determined to have the correct weight, the other elements of the recovered codeword can be recovered by a simple comparison thereto.

However, it may be the case that errors exist in each of the elements of a recovered codeword, i.e., that all of the weights are wrong. This is illustrated in FIG. 15. The latter is similar to FIG. 14, except that additional errors exist in each element of the recovered codeword as indicated by arrows 807 and 808. These errors are easily detected since the weights of each element of the recovered codeword are wrong. However, as noted above, it can be presumed that a value of "1" is correct. As such, since it is know that M'$_1$ and M'$_2$ are identical and that these are also the bit-complement of M, it is straightforward to correctly recover the codeword if some of the bits are incorrect. For example, since M'$_1$ and M'$_2$ are supposed to be identical, the "1" in the $5^{th}$ bit frame of bit frame group $K_3$ should also appear in the $5^{th}$ bit frame of bit frame group $K_1$. Likewise, the "1" in the $2^{nd}$ bit frame of bit frame group $K_1$ should also appear in the $2^{nd}$ bit frame of bit frame group $K_3$. Therefore, the bit-complement elements of the codeword can be recovered by performing a logical "OR" operation across all the bit-complement elements of the recovered codeword, e.g., M'$_1$ and M'$_2$. Thus, to verify the bit-complement elements of a recovered codeword, all the bit-complement elements of the recovered codeword are "ORed" together and the weight of the result is compared to (N-W). If the value of the resulting weight is correct, then the result is the correct bit-complement value for $M_1$ and $M_2$. After the correct recovery of either $M_1$ or $M_2$, the value for the binary-coded serial number, M, is simply the bit-complement of either $M_1$ or $M_2$.

It should be noted that a hacker can succeed in circumventing this binary coding bit-complement scheme by erasing enough "1s" from $M_1$ and $M_2$ such that the resulting weight of M'$_1$ "ORed" with M'$_2$ is less than (N-W). This is illustrated in FIG. 16 with respect to the errors indicated by arrows 804, 808 and 809. However, since the bit-frame positions of $M_1$ and $M_2$ are kept secret, and guessing them would be very difficult, if not impossible, a hacker would essentially have to attempt to find all of the "1s" marked in the film print out of 32,000 feet of film per reel.

Figure 17:
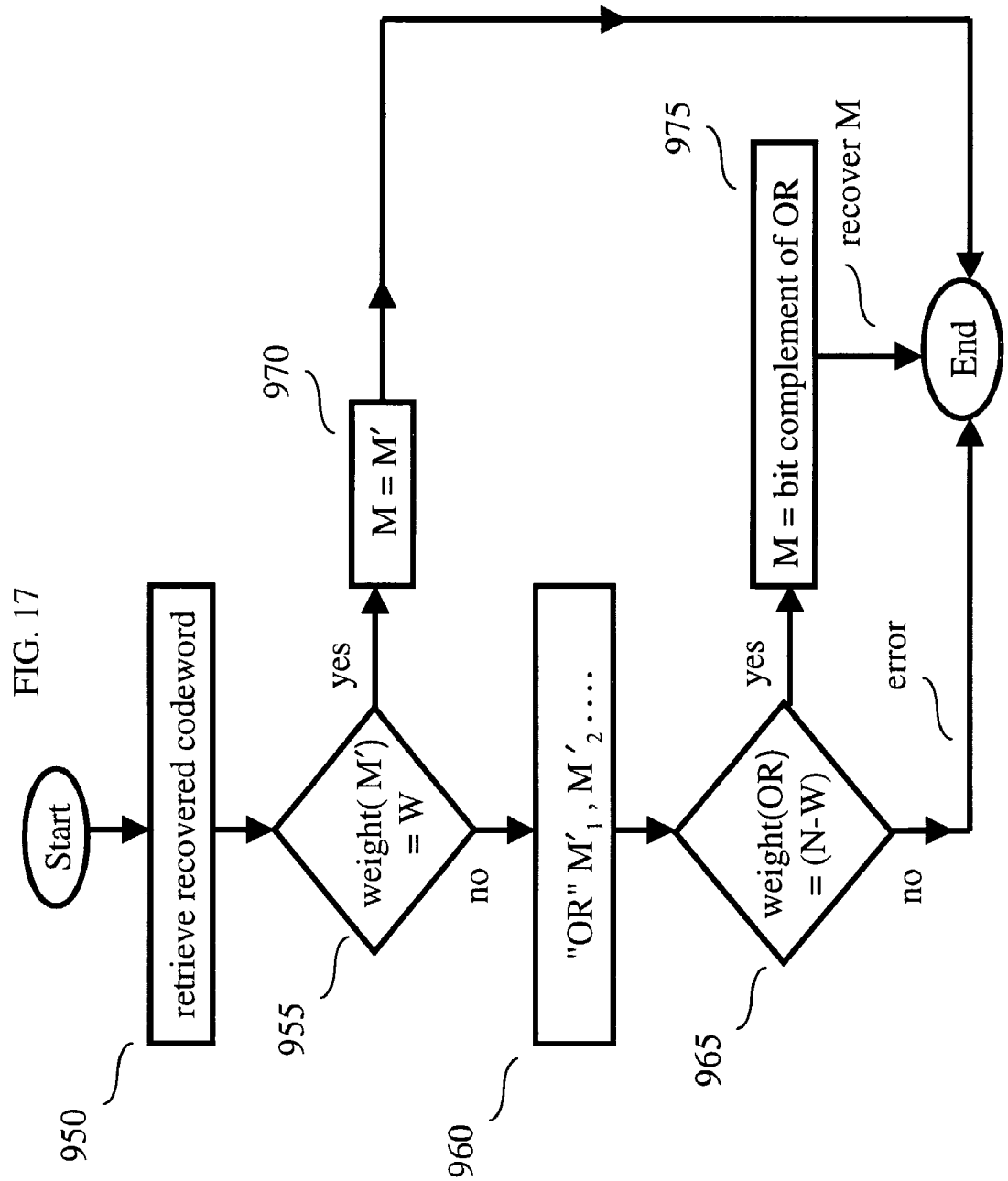

In view of the above, an illustrative binary-coding bit-complement recovery flow chart in accordance with the principles of the invention is shown in FIG. 17. In step 950, a film copy is processed to retrieve therefrom a recovered codeword. In step 955, the weight of the element, M', is checked against the predefined value for W. If the values match, the value of the binary-coded serial number M is set equal to M' and recovery is complete. However, if the weight of M' does not equal the predefined value for W, then the other bit-complement elements of the recovered codewords are "ORed" together in step 960. In step 965, the weight of the result from the "OR" operation is compared against the predefined weight (N-W). If the values match, the value of the binary-coded serial number M is set equal to the bit-complement of the "OR" result in step 975 and recovery is complete. However, if the weight of the result from the "OR" operation does not equal the predefined weight (N-W), then an "error" condition is declared, e.g., recovery is not possible, and the process ends. It should be noted that other variations to this recovery process are possible. For example, as a precursor to step 960, the weight of each of the individual bit-complement elements of the recovered codeword can first be compared in sequence against the predefined weight (N-W). As soon the weight of one bit-complement element matches the predefined weight (N-W), then M is set equal to the bit-complement of that element. In this variation, steps 960, 965 and 975 are only executed if none of the bit-complement elements individually match the predefined weight (N-W). It should be noted that although the binary-coded bit-complement serial number was described herein as comprising the binary-coded serial number (M) and two bit-complements thereof (M$_1$ and M$_2$), the inventive concept is not so limited. For example, the binary-coded bit-complement serial number may comprise the binary-coded serial number and any number of bit-complements thereof. In addition, the bit-complements may represent the bit-complement of the binary-coded serial number in its entirety, or portions thereof.

Figure 18:
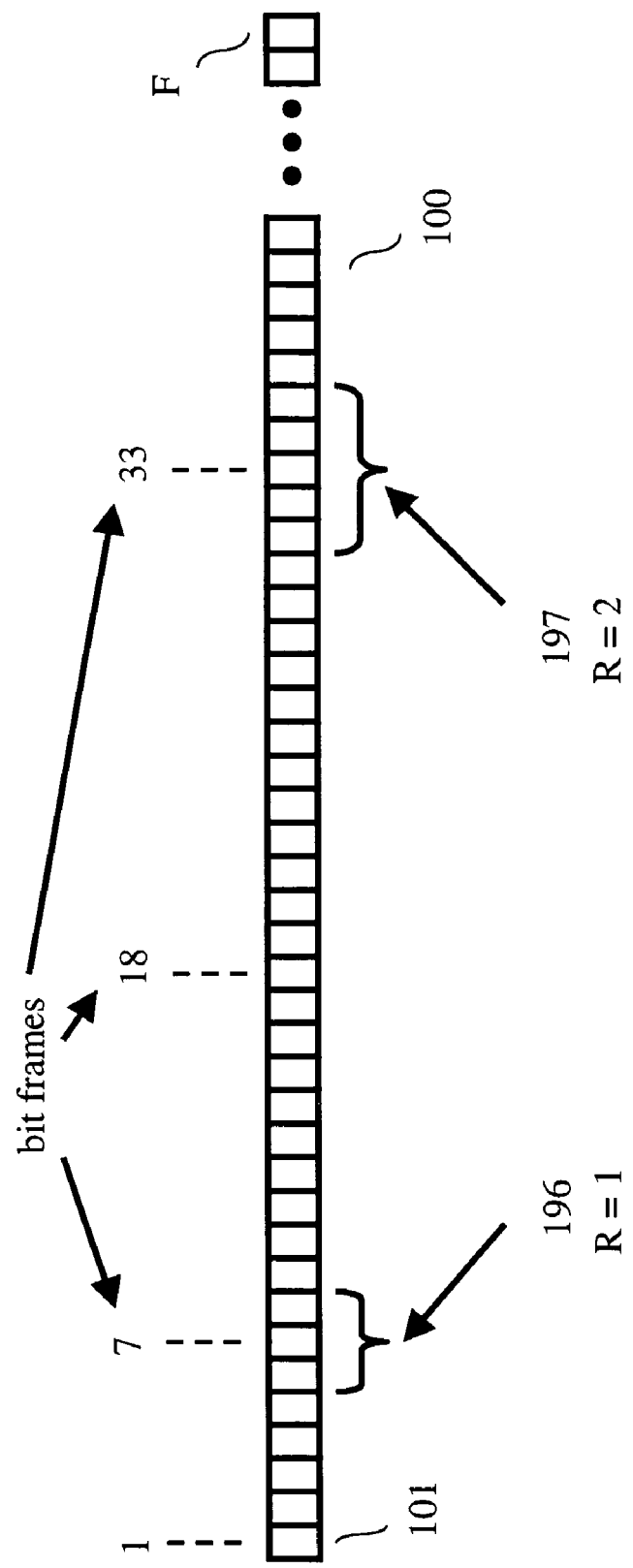
FIG. 18 illustrates bit multi-frames in accordance with the principles of the invention.

As described above, it has been assumed that a marking device can precisely mark specific bit frames without any error. However, this may not be the case. For example, the marking device may miss the action for marking, may get delayed to perform the action for marking, or the film-print may be shifted for some reasons, including the case when a hacker deletes some frames. As such, the "marked" bit frames may not occur, or be shifted in time. Therefore, and in accordance with the principles of the invention, a "bit frame" provides a reference point for a "bit multi-frame." In other words, a bit frame identifies a group of frames around the bit frame. Any one, or all, of which may be marked to convey, e.g., a "1" or a "0."One example of a bit multi-frame is shown in FIG. 18. The latter is similar to FIG. 2, except that each bit frame now provides a reference point to a group of bit frames. Arrow 196 illustrates a bit multi-frame for a value of R=1, i.e., the bit multi-frame includes bit frame 7 and one frame to the right or left. Another example is illustrated by arrow 197 for a value of R=2, i.e., where the bit multi-frame includes the bit frame 33 and two frames to the right or left. It should be observed that in the case of a boundary condition, e.g., use of bit frame 1 in FIG. 18, the bit multi-frame is truncated. It should also be noted that in the context of the earlier description associated with FIG. 2, R was equal to zero. In view of the above, the marking machine may aim at the bit frame (reference frame) of a bit multi-frame for marking, but, in effect, may mark any one of the 2R+1 frames thereof. As such, in recovering a mark, a mark in any one of the frames of a bit multi-frame can be used to recover the binary-coded serial number from a film copy. As such, the above-described EDC coding scheme incorporating "bit multi-frames" further enhances the "error resiliency," since recovery of the binary-coded serial number is possible even if the marking machine itself misplaces the mark on the wrong frame. It should be noted that although described in the context of a symmetric grouping of bit frames about the reference bit frame, a bit multi-frame is not so limited. For example, the distribution of bit frames about a reference bit frame may be asymmetric, e.g., (R+Y) bit frames in one direction and (R−Z) bit frames in another, where Y≧0 and Z≧0.

In view of the above, the foregoing merely illustrates the principles of the invention and it will thus be appreciated that those skilled in the art will be able to devise numerous alternative arrangements which, although not explicitly described herein, embody the principles of the invention and are within its spirit and scope. For example, although illustrated in the context of a predefined mark representing a particular bit value and the absence of the predefined mark representing the other bit value, different marks can be defined and used such that the presence of one mark on a frame represents one bit value, while the presence of the other mark on the frame represents the other bit value. In addition, although it is assumed that a print identifier is converted, or mapped, into a binary-coded serial number, the binary-coded serial number itself can be the print identifier, thus eliminating the conversion step. Also, although the use of particular frames were a priori identified as "bit frames," the invention is not so limited and any frames of a movie may simply be marked in accordance with the binary-coded serial number. It is therefore to be understood that numerous modifications may be made to the illustrative embodiments and that other arrangements may be devised without departing from the spirit and scope of the present invention as defined by the appended claims.

The invention claimed is:

1. A computer controlled method for marking a film print copy of a movie, the method comprising:
   associating a binary-coded serial number with the film print copy by a computer;
   forming a binary-coded bit-complement serial number from the binary-coded serial number;
   designating certain film frames of the film print copy as bit frames; and
   marking responsive to computer control, bit frames of the film print copy with a representation of a single bit value corresponding to the individual binary digits forming the binary-coded bit-complement serial number to form the serial number sequentially along the film print
   wherein the marking step further comprises
   representing a particular value of a binary digit with a predefined marking pattern on the bit frame and representing other value of the binary digit when the predefined marking pattern is not present on the bit frame.

2. The method of claim 1, further comprising the step of coding a film print identifier into the binary-coded serial number, wherein the film print identifier is a number or code.

3. The method of claim 1, wherein the binary-coded bit-complement serial number comprises a number of elements, each of which is associated with a different group of bit frames.

4. The method of claim 1, wherein each bit frame is associated with a bit multi-frame, which comprises a number of frames that are available for conveying a particular bit value.

5. The method of claim 1, wherein the binary-coded bit-complement serial number includes the binary-coded serial number and two bit-complements thereof.

6. The method of claim 1, wherein the bit frames are selected randomly.

7. A computer controlled identification method for a film copy, comprising:
   forming a binary-coded bit-complement serial number to represent the film copy by a computer;
   designating certain frames of the film copy as bit frames; and,
   sequentially marking bit frames responsive to computer control and in accordance with each individual bit value forming the binary-coded bit-complement serial number wherein;
   the sequentially marking step further comprises
   representing a particular value of a binary digit with a predefined marking pattern on the bit frame and representing other value of the binary digit when the predefined marking pattern is not present on the bit frame.

* * * * *